United States Patent
Collison et al.

(10) Patent No.: US 6,562,173 B1
(45) Date of Patent: May 13, 2003

(54) METHOD AND APPARATUS FOR FORMING TEXTILE PAD FOR LAMINATE FLOOR UNDERLAYMENT

(75) Inventors: Alan B. Collison, Pierce, NE (US); Chad A. Collison, Pierce, NE (US)

(73) Assignee: Midwest Padding L.L.C., Norfolk, NE (US)

( * ) Notice: Subject to any disclaimer, the term of this patent is extended or adjusted under 35 U.S.C. 154(b) by 0 days.

(21) Appl. No.: 09/535,802

(22) Filed: Mar. 28, 2000

(51) Int. Cl.[7] .................. B32B 27/02; B32B 31/12; B32B 31/20
(52) U.S. Cl. ................. 156/259; 156/271; 156/324; 428/74; 52/406.2
(58) Field of Search ................. 156/259, 271, 156/324; 428/74; 52/406.2

(56) References Cited

U.S. PATENT DOCUMENTS

| | | | |
|---|---|---|---|
| 3,733,381 A | * 5/1973 | Willette et al. | |
| 3,773,598 A | 11/1973 | Taeffner et al. | |
| 4,044,768 A | * 8/1977 | Mesek et al. | 128/287 |
| 4,082,878 A | 4/1978 | Boe et al. | |
| 4,138,521 A | 2/1979 | Brown | |
| 4,172,170 A | 10/1979 | Foye | |
| 4,360,554 A | 11/1982 | Campbell et al. | |
| 4,504,537 A | 3/1985 | Mussallem, Jr. | |
| 4,505,964 A | 3/1985 | Dierichs et al. | |
| 4,511,605 A | * 4/1985 | McCartney | 427/246 |
| 4,512,530 A | * 4/1985 | Rauschert et al. | 242/67.3 |
| 4,647,484 A | 3/1987 | Higgins | |
| 4,917,750 A | * 4/1990 | Klose | 156/254 |
| 4,927,705 A | * 5/1990 | Syme et al. | 428/282 |
| 4,988,551 A | 1/1991 | Zegler | |
| 5,080,944 A | 1/1992 | Kauffman et al. | |
| 5,082,705 A | 1/1992 | Rose | |
| 5,501,895 A | 3/1996 | Finley et al. | |
| 5,507,906 A | 4/1996 | Woods et al. | |
| 5,514,722 A | 5/1996 | DiGeronimo | |
| 5,531,849 A | 7/1996 | Collins et al. | |
| 5,545,276 A | 8/1996 | Higgins | |
| 5,578,363 A | 11/1996 | Finley et al. | |
| 5,612,113 A | 3/1997 | Irwin, Sr. | |
| 5,624,424 A | * 4/1997 | Saisaka et al. | 604/385.28 |
| 5,716,472 A | 2/1998 | Rossetti | |
| 5,733,624 A | * 3/1998 | Syme et al. | 428/68 |
| 5,762,735 A | 6/1998 | Collins et al. | |
| 5,763,040 A | 6/1998 | Murphy et al. | |
| 5,770,295 A | * 6/1998 | Alderman | 428/68 |
| 5,846,461 A | 12/1998 | Collins et al. | |
| 5,987,833 A | * 11/1999 | Heffelfinger et al. | 52/406.2 |
| 6,399,694 B1 | * 6/2002 | McGrath et al. | 428/430 |

* cited by examiner

*Primary Examiner*—Sam Chuan Yao
(74) *Attorney, Agent, or Firm*—Rothwell, Figg, Ernst & Manbeck

(57) ABSTRACT

A method and apparatus are provided for forming textile pads from a textile batt. The method includes the steps of splitting an incoming single textile batt and forming partial thickness textile batts, applying an adhesive to outer surfaces of the partial thickness textile batts, and adhering vapor barriers to the partial thickness textile batts. The apparatus comprises a pair of feed rollers for receiving a textile batt, a splitting knife downstream of the pair of feed rollers, adhesive appliers positioned downstream of the splitting knife and capable of applying an adhesive to outer surfaces of the partial thickness textile batts, vapor barrier supply positioned downstream of the adhesive appliers and capable of supplying vapor barriers that contact the outer surfaces of the partial thickness textile batts, pressure rollers positioned downstream of the pair of vapor barrier supply rollers.

19 Claims, 2 Drawing Sheets

METHOD AND APPARATUS FOR FORMING TEXTILE PAD FOR LAMINATE FLOOR UNDERLAYMENT

BACKGROUND OF THE INVENTION

1. Field of the Invention

The present invention relates generally to a method and apparatus for forming a textile pad for laminate floor underlayment. More specifically, the invention relates to a method and apparatus for splitting a textile batt and forming two textile pads therefrom.

2. Description of the Background Art

Textile pads are widely used in flooring applications. A pad is desirable when a flooring is applied over a sub-flooring.

Pads used in flooring applications serve multiple purposes. They may absorb impact, such as from persons walking on the flooring. They may provide sound deadening, and may provide insulating properties against heat transfer. Pads also may accommodate roughness, unevenness, or other flaws in the sub-flooring, and may provide a barrier against moisture and dirt. Finally, pads may lessen impact stresses on the flooring to lengthen the life of the flooring and make the flooring appear to be more durable and of a higher quality.

In the related art, a textile pad is not commonly used under laminate flooring. This is because a pad would have to be relatively thin so as to not cause any unevenness in transition areas (i.e., areas of flooring type transition, such as in doorways, etc.). In order to be acceptable, therefore, it is desirable that a laminate flooring pad be less that about ¼ of a inch in thickness, and more preferably about ⅛ inch in thickness.

In the related art, commercially available textile batts generally do not exist in thicknesses less than about ¼ of an inch. This is due to the soft, compressible, and pliable nature of the textile batt which heretofore has made a smaller thickness textile batt difficult to manufacture, if not impossible. As a result, related art laminate floors use something other than a textile pad.

What is needed, therefore, are improvements in methods and apparatus for forming textile pads for a laminate floor underlayment.

SUMMARY OF THE INVENTION

A method for forming textile pads from a textile batt is provided according to a first aspect of the invention. The method comprises the steps of feeding a textile batt in a first direction, splitting the textile batt longitudinally as the textile batt is fed, thereby forming a plurality of partial thickness textile batts, applying an adhesive to an outer surface of each of the partial thickness textile batts as the partial thickness textile batts are fed, and adhering a vapor barrier material to the adhesive coated surface of each of the partial thickness textile batts to form a plurality of textile pads. In preferred aspects of this method, the partial thickness textile batts and plastic vapor barriers are passed through pressure rollers and partially compressed. The pressure rollers are maintained at an elevated temperature.

A method for forming two textile pads from a textile batt is provided according to a second aspect of the invention. The method comprises the steps of splitting the textile batt as the textile batt is fed, forming two partial thickness textile batts, wherein the textile batt is selected from the group consisting of polyester, nylon, acrylic, and cotton, or combinations thereof, applying an adhesive to outer surfaces of the two partial thickness textile batts as the two partial thickness textile batts are fed, and passing the two partial thickness textile batts and the two plastic vapor barriers through a pair of pressure rollers and partially compressing the two partial thickness textile batts and the two plastic vapor barriers at a pressure of about 400 psi and maintaining the pair of pressure rollers at a temperature of about 200 degrees Fahrenheit during bonding of the adhesive to form the two textile pads.

An apparatus for forming a plurality of textile pads from a textile batt is provided according to another aspect of the invention. The apparatus comprises a pair of feed rollers for receiving a textile batt, a splitting knife downstream of the feed rollers and capable of splitting the textile batt to produce partial thickness textile batts, adhesive appliers positioned downstream of the splitting knife and capable of applying an adhesive to an outer surface of each of the partial thickness textile batts, vapor barrier supply positioned downstream of the adhesive appliers and capable of supplying vapor barrier material that contacts the outer surfaces of the partial thickness textile batts, and pressure rollers positioned downstream of the vapor barrier supply and capable of partially compressing the partial thickness textile batts to bond of the vapor barrier adhesive.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 1:
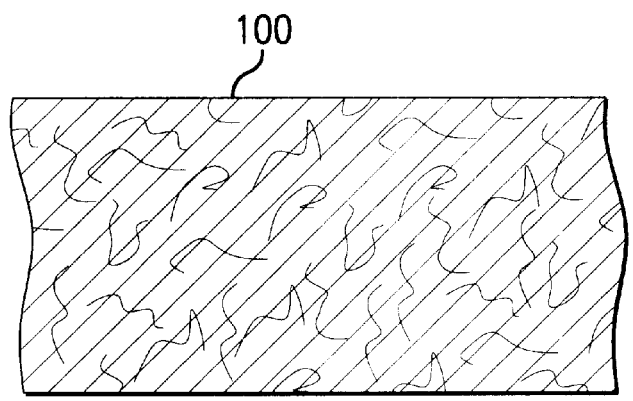
FIG. 1 shows a side or cross-sectional view of a portion of a textile batt.

FIG. 1 shows a side or cross-sectional view of a portion of a textile batt 100. The textile batt 100 is commonly available in rolls of widths of about six feet and may range in thickness from about ¼ of an inch and up. This is too thick for a laminate floor underlayment for reasons given above.

The present invention solves the problem in the related art by providing a method and apparatus for splitting the textile batt 100 in order to form a plurality of textile pads of a desired thickness. The present invention is capable of splitting a textile batt 100 to achieve for example a thickness of about ¹⁄₁₆ of an inch, and forming textile pads therefrom.

The textile batt 100 may be manufactured from any of a wide variety of textile compositions, such as, for example, polyester, nylon, acrylic, cotton, polypropylene etc., or combinations thereof, including both natural and man-made fibers. The textile batt 100 is comprised of textile components, but does not have to be a woven material.

Figure 2:
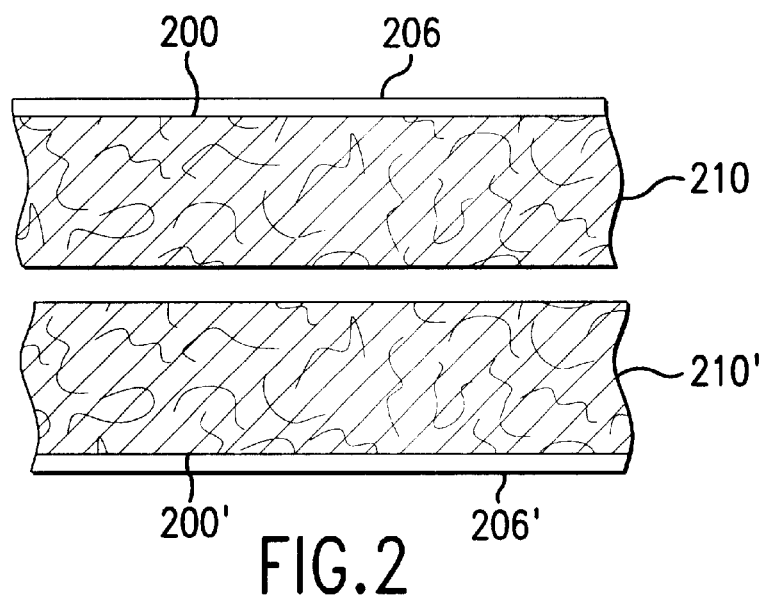
FIG. 2 shows two textile batts bonded to vapor barriers to form the two textile pads.

FIG. 2 shows two textile batts 200' and 200 bonded to vapor barrier layers 206' and 206 to form the two textile pads 210' and 210. The resulting pads may be used as a laminate flooring underlayment or as a pad for other types of flooring or for other purposes. The commercially available textile batt 100 has been split into two partial thickness batts 200' and 200, and each batt has been bonded to a vapor barrier layer 206' and 206.

Each partial thickness batt 200' and 200 may be of equal thickness (i.e., the textile batt 100 is split in half), or may be of unequal thicknesses. The present invention is capable of forming a partial thickness batt of about 1/16 of an inch or greater. The starting textile batt may be split longitudinally to provide two, three or more partial thickness batts.

Figure 3:
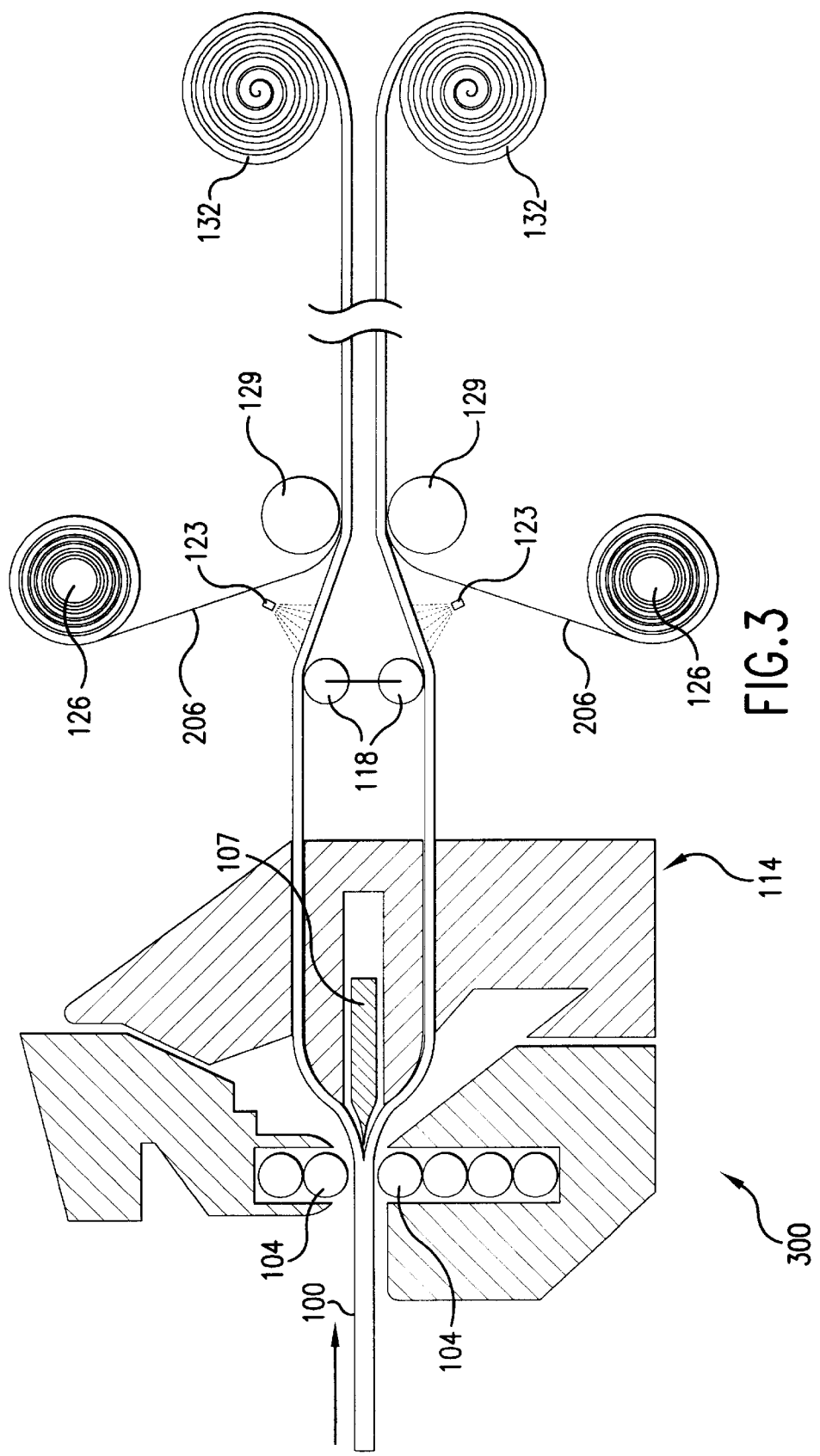
FIG. 3 shows an apparatus for forming two textile pads from the textile batt.

FIG. 3 shows an apparatus 300 for forming two textile pads from the textile batt 100. The apparatus includes a splitting machine 114, a pair of tension rollers 118, adhesive appliers 123, a pair of vapor barrier supply rollers 126 providing the vapor barrier layers 206, a pair of pressure rollers 129, and a pair of take-up rollers 132.

The splitting machine 114 in the preferred embodiment is a Mercier Turner Scimatic NT6 splitting machine, and includes a pair of feed rollers 104 and a splitting knife 107. Alternatively, the apparatus 300 may include a set of feed rollers 104 and a splitting knife 107 in place of the splitting machine 114.

The feed rollers 104 receive the textile batt 100 and pass it to the splitting knife 107, where the textile batt 100 is split into the two partial thickness batts 200' and 200. The thickness of each partial thickness batt is determined by the both thickness of the textile batt 100 and the position of the splitting knife 107 in relation to the feed rollers 103. When the splitting knife 107 is substantially centered between the feed rollers 104, the textile batt 100 will be split into two substantially equal partial thickness batts.

In the present invention, it has been found that the textile batt 100 maybe controllably and accurately split if the feed rollers 104 are within a predetermined distance from the splitting knife 107. The distance is important because of the compressible and pliable nature of the textile batt 100. In the preferred embodiment, the predetermined distance is from about zero to about two millimeters.

In a preferred embodiment using the Mercier Turner splitting machine 114, the splitting machine 114 is modified by adjusting the feed rollers 104 to a position as close as possible to the splitting knife 107, and removing feed guides so that the splitting knife 107 may be moved closer. In addition, the splitting machine 114 is modified by changing the feed rollers 104 from a serrated surface type of multiple sections to a smooth surface type of a single piece construction.

The tension rollers 118 maintain a predetermined amount of tension on the two partial thickness batts 200' and 200.

The adhesive appliers 123 are downstream of the tension rollers 118 and apply adhesive to outer surfaces of the two partial thickness batts. In a preferred embodiment, the adhesive appliers 123 spray a layer of adhesive onto the two partial thickness batts. Alternatively, the adhesive appliers 123 may apply the adhesive directly, such as, for example, wipers or brushes.

The adhesive is preferably a high viscosity, low melting point adhesive that is applied hot and forms a bond as it cools (i.e., a "hot melt" adhesive). Such adhesives are available from H. B. Fuller, from Swift Adhesive, and from Western Adhesive (the Western Adhesive product is sold under the product name of RHM542). Alternatively, any other adhesive capable of bonding the textile batt to the vapor barrier may be used.

The pair of vapor barrier supply rollers 126 are also downstream of the tension rollers 118 and supply a vapor barrier 206' and 206 to each of the two partial thickness batts 200' and 200.

The vapor barrier preferably is a plastic sheet material, typically about ½ to about 1 mil in thickness. The vapor barrier, as the name implies, prevents the travel of vapor (usually water vapor) through the textile pad 210' or 210. In the preferred embodiment the vapor barrier 206' and 206 is coextruded polyethylene, but alternatively any flexible vapor barrier of a suitable thickness may be used.

The pair of pressure rollers 129 are downstream of the adhesive appliers 123 and the vapor supply rollers 126. The pair of pressure rollers 129 bring together the two partial thickness batts 200' and 200 and the two vapor barriers 206' and 206 to form the two textile pads 210' and 210. The pair of pressure rollers 129 heat and partially compress the batts during the bonding of the adhesive to form the two textile pads.

In the preferred embodiment, the pressure rollers 129 apply about 400 psi (pounds per square inch) of pressure to the two partial thickness textile batts 200' and 200 and to the vapor barriers 206' and 206. In addition, the pressure rollers 129 are maintained at a temperature of about 200 degrees Fahrenheit. The heating partially softens or breaks down the vapor barrier to make it pliable and to aid in penetration of the vapor barrier by the adhesive.

Downstream of the pressure rollers 129 is a pair of take-up rollers 132. The pair of take-up rollers 132 may be used to roll up the finished textile pads 210' and 210. The finished textile pads 210' and 210 may be used as a floor underlayment, a laminate floor underlayment, as part of a paint drop cloth, etc.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A method for forming textile pads from a textile batt, comprising the steps of:

splitting an incoming single textile batt and forming partial thickness textile batts of a thickness about 1/16 inch;

applying an adhesive to outer surfaces of said partial thickness textile batts; and adhering a vapor barrier layer to each of the partial thickness textile batts to form a plurality of textile pads each containing an attached vapor barrier layer;

wherein said method steps are carried out in a continuous, in-line manufacturing process; and wherein a textile pad formed according to said method comprises a laminate floor underlayment.

2. The method of claim 1, wherein said textile batt comprises natural fibers.

3. The method of claim 1, wherein said textile batt comprises man-made fibers.

4. The method of claim 1, wherein said textile batt is selected from the group consisting of polyester, nylon, acrylic, and cotton, polypropylene or combinations thereof.

5. The method of claim 1, wherein said two partial thickness textile batts are of unequal thickness.

6. The method of claim 1, wherein said partial thickness textile batts are of equal thickness.

7. The method of claim 1, wherein said vapor barrier layer comprises plastic.

8. The method of claim 1, wherein said vapor barrier layer comprises coextruded polyethylene.

9. The method of claim 1, wherein said vapor barrier layer is about ½ to about 1 mil in thickness.

10. The method of claim 7, further comprising the step of passing said partial thickness textile batts and said plastic vapor barriers through a pair of pressure rollers.

11. The method of claim 7, further comprising the step of passing said partial thickness textile batts and said plastic vapor barriers through a pair of pressure rollers which apply a pressure of about 400 psi.

12. The method of claim 7, further comprising the step of passing said partial thickness textile batts and said plastic vapor barriers through a pair of pressure rollers and said pair of pressure rollers are maintained at a temperature of about 200 degrees Fahrenheit.

13. The method of claim 1, wherein the splitting step further comprises:
providing a splitting knife; and
providing a pair of feed rollers that are positioned about zero to about 2 millimeters from said splitting knife.

14. A method for forming textile pads from a textile batt, comprising the steps of:
splitting an incoming single textile batt and forming partial thickness textile batts of a thickness about 1/16 inch, wherein said textile batt is selected from the group consisting of polyester, nylon, acrylic, and cotton, polypropylene or combinations thereof;
applying an adhesive to outer surfaces of said partial thickness textile batts;
adhering a plastic vapor barrier to each of the partial thickness textile batts to form a plurality of textile pads each having an attached vapor barrier layer; and
passing said partial thickness textile batts and said plastic vapor barriers through pressure rollers and partially compressing said partial thickness textile batts and said plastic vapor barriers at a pressure of about 400 psi and maintaining said pressure rollers at a temperature of about 200 degrees Fahrenheit during bonding of said adhesive;
wherein said method steps are carried out in a continuous, in-line manufacturing process; and
wherein a textile paid formed according to said method comprises a laminate floor underlayment .

15. The method of claim 14, wherein said two partial thickness textile batts are of unequal thickness.

16. The method of claim 14, wherein said partial thickness textile batts are of equal thickness.

17. The method of claim 14, wherein a plastic vapor barrier comprises coextruded polyethylene.

18. The method of claim 14, wherein a plastic vapor barrier is about ½ to about 1 mil in thickness.

19. The method of claim 14, wherein said pair of feed rollers are positioned about zero to about 2 millimeters from said splitting knife.

\* \* \* \* \*